Nov. 18, 1952  J. JOHNSTONE  2,618,097
FISHHOOK
Filed Oct. 18, 1949
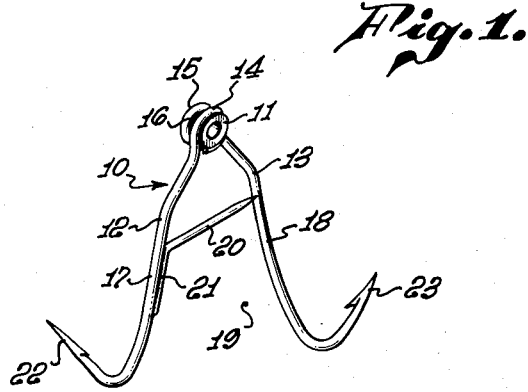
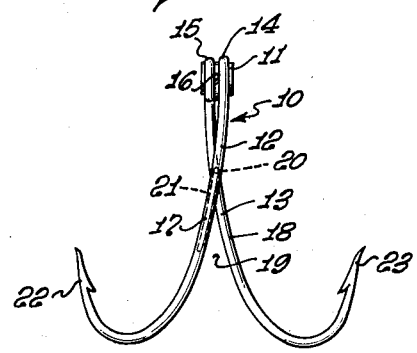
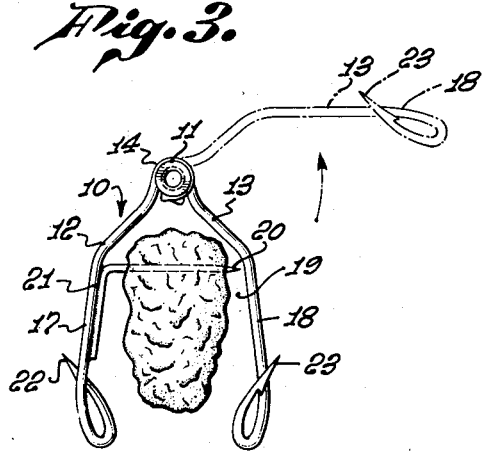
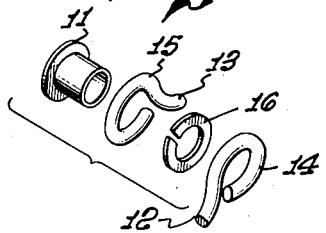
JACK JOHNSTONE,
INVENTOR.
BY *Harry Kubo*
ATTORNEY.

Patented Nov. 18, 1952

2,618,097

UNITED STATES PATENT OFFICE 2,618,097

FISHHOOK

Jack Johnstone, Los Angeles, Calif.

Application October 18, 1949, Serial No. 122,091

5 Claims. (Cl. 43—44.8)

This invention relates to a fish-hook and more particularly to a double fish-hook and bait-holder.

The general object of the invention is to provide such a fish-hook and bait-holder which has the constructional elements so arranged and disposed that live or other bait may be securely impaled and held between the two fish-hook elements so as to enhance the angler's ability to quickly hook and catch any fish that attacks the bait so held between the two fish-hook elements.

A further object of the invention is to provide a double fish-hook and bait-holder which has fish-hook elements which may be separated easily so that live bait may be secured to a bait-holding element.

A further object of the invention is to provide a combined fish-hook and bait-holder which is simple and inexpensive to manufacture and is composed of a minimum of parts.

A still further object of the invention is to provide a unitary double fish-hook and bait-holder which will assure the snagging of a fish regardless whether the fish strikes either side of the bait or the whole bait.

Another object of the invention is to provide a fish-hook construction which will render it impossible for the fish to mouth the bait, without being hooked, thus entangling the line or leader in underwater obstructions which may cause loss of the fish and terminal tackle.

Another object of the invention is to provide a fish-hook construction which is adaptable to accommodate various sizes of baits.

Another object of the invention is to provide a fish-hook construction which is ready for instant use without the necessity of using rings or other securing devices to form a multiple fish-hook.

Fish-hooks are ordinarily composed of a shank having at its upper portion an eye and at its lower portion a barb. The bait is impaled upon the barb. Certain fish, such as bass, pickerel, catfish, perch and other fish, often mouth the bait before taking enough of it to enable the angler to strike early to hook the fish. When the fish has thus mouthed the bait, without being hooked, the line may be held long enough to entangle the line or leader in rocks, bushes, weeds or other underwater obstructions, thus often causing loss of the fish. This is particularly the case with game fish which attack the bait from the side, rather than swallowing the bait whole. Attempts have been made in prior art constructions to utilize multiple hooks, but their complicated design has rendered them impractical for use as an efficient angling device.

In accordance with the present invention, I provide a double fish-hook and bait-holder comprising two fish-hook elements joined together at the eyes of the fish-hook elements by a hub, which may be formed by swaging the hook-eyes on an eyelet or grommet, with a split lock washer, or other friction member, positioned between the inner surfaces of the eyes, the shanks of each of the hooks being bent to provide room for a bait between the hook shanks, and a bait-pin secured to the shank of one of the two hooks, pointing inwardly, the barbs of the fish-hooks being bent outwardly from the shanks so that the points thereof will stand clear of any bait placed between the hook shanks on the bait-pin.

Thus, in an embodiment of the present invention, the fish-hook elements may be of appropriate size, depending upon the size of the fish sought to be caught. As is well known to those skilled in the art of angling, game fish of any designated variety may be taken by bait varying in size within a minimum and maximum size range. Bait varying in size between the said minimum and maximum are adaptable to be impaled upon the bait-pin and securely held between the shanks of the fish-hook elements. The hooks may be joined together in any suitable manner so that the fish-hook elements may pivot about the point of joinder, but friction between the two eyes and the retaining element should be such that when the hooks are positioned, either apart or together, the hooks will be frictionally retained in position. When the fish-hook elements are spread apart, a bait, such as a minnow, for example, may be impaled upon the bait-pin. In the use of a minnow or other small fish or organism as bait, the pin is thrust laterally through one side and out the other side of the bait. The fish-hook elements are then pressed together sufficiently to prevent the bait from slipping off the pin, the points of the barb, however, being clear of any bait held between the fish-hook shanks and impaled upon the bait-pin.

Such a combined fish-hook and bait-holder, in use, makes it impossible for a fish to mouth the bait, without being hooked. A fish striking either side of the bait, or the whole bait, will, at the same time, take one or both of the hooks, thereby making possible the snagging of the fish by the angler and avoiding the entanglement of the line and the loss of the fish.

In the accompanying drawings I have illustrated by way of example, but not by way of limitation, a specific embodiment of my invention. In such drawings Fig. 1 is a perspective view of a fish-hook embodying my invention. Fig. 2 is a side view of the fish-hook. Fig. 3 is a front view showing, in dotted lines the rotatable characteristic of the fish-hook element and indicating how the bait is impaled upon the bait-pin. Fig. 4 is a perspective view of the selected elements which are joined to form a hub and friction pivot.

Referring more particularly to the drawings in which similar reference characters identify similar parts in the several views 10 is a double fish-hook and bait-holder which is unitary in construction. The fish-hook 10 has as one of its component parts an eyelet or grommet 11. Two fish-hook elements 12 and 13 have eyes 14 and 15 at their upper extremities. The eyes 14 and 15 may be swaged on the eyelet or grommet 11 or otherwise secured thereto. Between the eyes 14 and 15 on the eyelet 11 a split lock washer 16 or other friction element is positioned on the eyelet between the fish-hook elements 12 and 13. The friction between the eyes 14 and 15 and the friction element 16 is such that the fish-hook elements 12 and 13 may be rotated about the hub so formed but free rotation is prevented. The split lock washer 16, due to its inherent characteristics, provides laterally projecting holding elements on opposite sides of its split which serve to engage the eyes 14, 15 with the friction force necessary to prevent the aforementioned free rotation.

The fish-hook elements 12 and 13 have shanks 17 and 18 which are shaped to form a bait-receiving aperture 19. A bait-pin 20 is secured to one of the shanks 17 at 21 in a manner well known to those skilled in the art. Thus positioned the bait-pin 20 is substantially perpendicular to the shank 17 and points inwardly. The lower extremities of the fish-hook elements 12 and 13 terminate in barbs 22 and 23. As is shown in the drawing, particularly Figs. 1–3 the barbs 22 and 23 are bent outward from the shanks 17 and 18 to stand clear of any bait placed between the hook shanks 17 and 18 on the bait-pin 20.

The several elements shown in Fig. 4, namely the eyes 14 and 15, the friction member 16 and the eyelet or grommet 11 form a friction pivot point or hub about which the fish-hook elements 12 and 13 may rotate. When the fish-hook elements 12 and 13 are spread apart, as shown in dotted lines in Fig. 3 bait may be impaled upon the bait-pin 20, as shown in Fig. 3. The fish-hook elements 12 and 13 are then brought together until the bait is securely held on the bait-pin 20 between the shanks 17 and 18. The barbs 22 and 23, however, will be clear of the bait.

It will be apparent from the above description that I have provided a novel fish-hook and bait-holder construction which has numerous advantages which may be summarized as constituted by the provision of two fish-hook elements, eyes at the upper portion of said fish-hook elements, the two eyes being pivotally and frictionally joined together, the shanks of each of said fish-hook elements being bent to provide room for a bait between said shanks and a bait-pin secured to the shank of one of the hooks in perpendicular relation to the lower part of said shank, the barbs of the fish-hook elements being bent outwardly from the shanks so that the points thereof will stand clear of any bait placed between the hook shanks on the bait-pin. The two fish-hook elements are adapted to be spread apart so that live bait may be impaled upon the bait-pin and adapted to be brought together, thus securing the bait between the shanks of said fish-hook elements.

While I have described a particular embodiment of my inventive structure it is obvious that various changes therein may be made without departing from my invention.

I claim:

1. A fish-hook comprising a grommet, two fish-hook elements having eyes at their upper extremities, intermediate shank portions and curved barbs at their lower extremities, said fish-hook elements being pivotally attached to said grommet by said eyes for rotative movement about said grommet, a bait pin secured to a shank portion of one of said elements and extending toward the shank portion of the other of said elements, and a friction member positioned between said eyes and provided with laterally extending portions engaging said eyes to resist free rotation between said fish-hook elements and hold them securely in various relative positions of adjustment.

2. A fish-hook comprising a hollow hub, two fish-hook elements having an eye at each of their upper extremities, shank portions and curved barbs at their lower extremities, said barbs curving in opposite directions, said fish-hook elements being pivotally attached to said hub by said eyes and extending radially from said hub for vertical swinging movement about the horizontal axis of said hub, a bait-pin perpendicularly secured to a shank of one of said fish-hook elements and pointing inwardly toward the shank portion of the other of said elements, the extremity of said pin being adapted to have bait impaled thereon when said fish-hook elements are spread apart to form sufficient clearance therefor, and a friction member positioned between said eyes and having laterally projecting holding elements engaging said eyes to frictionally hold the fish hook elements in predetermined positions relative to each other.

3. A fish-hook comprising two fish-hook elements, eyes at the upper extremities of said fish-hook elements, said fish-hook elements having central shank portions, said shank portions being shaped to provide for the positioning of bait between said shank portions, a bait-pin secured to the shank portion of one of said fish-hook elements in perpendicular relation to the lower part of said shank portion and pointing inwardly toward the shank portion of the other element, and oppositely curved barbs at the lower extremities of said fish-hook elements, said barbs being bent slightly outwardly from said shank portions so that the points thereof will clear any bait placed between said shank portions on said bait-pin, the upper extremities of said fish-hook elements provided with the eyes having associated therewith a holding means in alignment with the eyes, said holding means having laterally projecting holding elements to frictionally hold the fish-hook elements in predetermined positions relative to each other.

4. A fish-hook comprising an eyelet, two fish-hook elements, a bait-pin secured to one of said fish-hook elements, each of said fish-hook elements having an eye at the upper extremity thereof, each of said fish-hook elements being pivotally attached to said eyelet by said eye for individual rotative movement about said eyelet, and a split lock washer having laterally extending elements positioned between and engaging said eyes on said eyelet to resist free rotation between said elements whereby the fish-hook elements may be swung open to permit bait to be impaled upon said bait-pin and swung closed to securely retain the bait upon said bait-pin between said fish-hook elements and hold said elements securely in various positions of adjustment with respect to each other.

5. Fish-hooks having eyes in axial alignment at one end thereof, each hook having a shank, a curved portion and a barb at the end of the curved portion, the ends of the hooks provided with the eyes having associated therewith a holding means in alignment with the eyes, said holding means having laterally projecting holding elements to frictionally hold the hooks in predetermined positions relative to each other, and a bait holder secured to the shank of one hook beneath the eyes of said hooks and extending toward the shank of the other hook.

JACK JOHNSTONE.

REFERENCES CITED

The following references are of record in the file of this patent:

UNITED STATES PATENTS

| Number | Name | Date |
| --- | --- | --- |
| 454,581 | Mack | June 23, 1891 |
| 794,352 | Gebhardt | July 11, 1905 |
| 807,514 | Stockwell | Dec. 19, 1905 |
| 2,164,708 | Hadaway | July 4, 1939 |
| 2,193,103 | Kowalski | Mar. 12, 1940 |

FOREIGN PATENTS

| Number | Country | Date |
| --- | --- | --- |
| 725,356 | France | May 11, 1932 |